UNITED STATES PATENT OFFICE.

LOUIS L. JACKSON, OF NEW YORK, N. Y., ASSIGNOR OF ONE-HALF TO ODUS C. HORNEY, OF NEW YORK, N. Y.

PROCESS OF PRODUCING FERTILIZERS FROM SILICATES.

1,232,553.   Specification of Letters Patent.   Patented July 10, 1917.

No Drawing.   Application filed June 16, 1916.   Serial No. 104,105.

*To all whom it may concern:*

Be it known that I, LOUIS L. JACKSON, a citizen of the United States, residing at New York city, county of Queens, and State of New York, have invented a new and useful Improvement in Processes of Producing Fertilizers from Silicates, of which the following is a full, clear, and exact description.

The object of my invention is to provide a method whereby the combination existing in silicates may be broken up to form new compounds and the product treated to convert the same into a commercial fertilizer.

The process may be divided into two steps, first, the digesting process wherein the silicates are treated with a hydrate of an alkaline earth metal, preferably calcium, or a hydrate of an alkali metal, or a mixture of the same, and water, and subjected to heat and pressure; and, second, the treatment of the product of the digestion. The second treatment will vary with the specific results desired and involves the practice of different alternative processes having independent features of novelty but having certain characteristics in common.

In order that my invention may be clearly understood I will illustrate the same by describing the application of the process to a feldspar which may be assumed, without taking into account the presence, in small proportions, of other ingredients and some impurities, to consist essentially of the silicates of potassium, sodium and aluminum.

I take a certain quantity of feldspar finely ground, a slightly larger quantity of lime, and mix the same with water in an amount by weight (say) about six times the weight of the lime. The whole is thoroughly incorporated and the mass, while confined, is subjected to a temperature of (say) 200 degrees centigrade for (say) ten hours.

The above treatment is described more in detail in an application filed by me June 16, 1916, Serial No. 103,973. Such treatment, so far as the present invention is concerned, is novel only so far as it is the first or preliminary step in the production of a fertilizer from feldspar; and I do not herein intend to be limited to any particular proportions of the reagents that are employed in the execution of said step.

At the end of the digestion, the product may be treated in a variety of ways, which will now be described.

1. The entire product is treated with carbon dioxid (that is, with kiln gas or any gas containing $CO_2$ in sufficient percentage). The entire product is then dried and powdered; or the liquid portion may be separated and evaporated to dryness and mixed with the dried cake and the mixture powdered. The amount of gas used may be just sufficient to convert the alkali metal and calcium hydrate present into carbonates. The finished product will then contain calcium silicate, calcium aluminate, calcium carbonate, potassium carbonate, sodium carbonate and any undecomposed feldspar. In other words, there is present all the elements of feldspar in a soluble or readily decomposable form, plus calcium carbonate, the latter in the form of precipitated chalk, which is a much better land dressing than ground limestone.

2. The process is the same as (1) except that the amount of gas used is sufficient to convert the alkali metal compounds to carbonates and all the calcium present to calcium carbonate. The finished product will then contain silica, aluminum hydrate, calcium carbonate, potassium carbonate, sodium carbonate and any undecomposed feldspar.

It is evident that any amount of gas between the two quantities specified in (1) and (2) may be used. In practice it would be necessary to use a little more than what is theoretically sufficient to convert the alkali metal and calcium hydrate into carbonates, in order to insure not getting a caustic product.

3. The product of digestion is filtered and the solution filtered out treated with carbonic (or other) acid, evaporated to dryness and used later as hereinafter described. The filter cake is treated with sulfuric acid (waste acid) of any convenient strength, using sufficient acid to neutralize the calcium hydrate present. The mass is filtered, the liquor (containing nothing but a little calcium sulfate) thrown away, and the cake is dried, mixed with the alkaline carbonates and powdered. The product will contain calcium sulfate, calcium silicate, calcium aluminate, potassium carbonate, sodium carbonate and undecomposed feldspar; in other words, all the elements of feldspar in a soluble or readily decomposable form, plus precipitated calcium sulfate, the latter being superior to ground gypsum.

4. The product of digestion is filtered and the solution filtered out treated with carbonic (or other) acid, evaporated to dryness and used later as hereinafter described. The filter cake is treated with sufficient waste sulfuric acid to combine with all the calcium present. The mass is filtered out, the liquor (containing nothing but a little calcium sulfate) is thrown away, and the cake is dried, mixed with the alkali metal carbonates and powdered. The product will contain calcium sulfate, silica, aluminum hydrate, potassium carbonate, sodium carbonate and any undecomposed feldspar.

5. The product of digestion is filtered and the solution filtered out treated with carbonic (or other) acid, evaporated to dryness and used later as hereinafter described. The filter cake is treated with sufficient waste sulfuric acid to combine with all the calcium present. When all the calcium has been converted into sulfate, the mass is filtered, and the liquor thrown away. The cake is treated with sufficient additional sulfuric acid to dissolve the aluminum hydrate, is filtered again, and this liquor is concentrated to recover the aluminum sulfate either as such or by the addition of the requisite amount of ammonium or potassium sulfate as ammonium or potassium alum. The cake is mixed with the alkali metal carbonates, dried and powdered. The product will contain calcium sulfate, silica, sodium carbonate, potassium carbonate and undecomposed feldspar.

It is clear that mixtures between those specified in (3) and (4) and in (4) and (5) may be made. In practice there is bound to be some admixture.

6. The product of digestion is filtered and the solution treated with carbonic (or other) acid, evaporated to dryness and used later as hereinafter described. The filter cake is then treated with a solution of niter cake (substantially $NaHSO_4$) in quantity sufficient to convert the calcium hydrate present into calcium sulfate and the niter cake used into sodium sulfate. The mass is filtered and the liquor is concentrated and the sodium sulfate is recovered from it. The cake is dried, mixed with the alkali metal carbonates, and the mixture powdered. The products are: (a) sodium sulfate, and (b) a fertilizer in all respects like that produced in process (3).

7. The product of digestion is filtered and the solution treated with carbonic (or other) acid, evaporated to dryness and used later as hereinafter described. The filter cake is then treated with a solution of niter cake in quantity sufficient to convert all the calcium present into calcium sulfate and the niter cake used into sodium sulfate. The mass is filtered and the liquor is concentrated and the sodium sulfate is recovered from it. The cake is dried, mixed with the alkali metal carbonates, and the mixture powdered. The products are: (a) sodium sulfate, and (b) a fertilizer in all respects like that produced in process (4).

8. The product of digestion is filtered and the solution treated with carbonic (or other) acid, evaporated to dryness and used later as hereinafter described. The filter cake is then treated with a solution of niter cake in quantity sufficient to convert all the calcium present into calcium sulfate, the aluminum hydrate formed into sodium, alum and the niter cake used into sodium sulfate. The niter cake is added in two stages. Sufficient niter cake is first added to convert all the calcium to sulfate (practically no alumina will be dissolved up to this point) and the mass is filtered. Sodium sulfate is recovered from the liquors filtered out. The cake may be washed slightly (although washing is not necessary at this stage) and is again suspended in water and treated with sufficient niter cake to dissolve the alumina. The mass is again filtered and the cake washed thoroughly—finally with a little lime water to remove all traces of acidity, and dried. This liquor is concentrated and the aluminum sulfate separated from the sodium sulfate by crystallization, preferably after the addition of the calculated amount of potassium or ammonium sulfate to form potassium or ammonium alum. The cake is dried, mixed with the alkali metal carbonates, and the mixture powdered. The products are: (a) sodium sulfate, (b) alum, and (c) a fertilizer in all respects like that produced in process (5).

9. If, in practising the processes (3), (4) and (5), the waste sulfuric acid contains a considerable percentage of nitric acid, the procedure is slightly modified. In processes (3), (4) and (5) the liquor is not thrown away, as it contains calcium nitrate, which can be recovered as such and added to the fertilizer. Alternatively, by adding the solution of alkali metal carbonates to the solution of calcium nitrate, calcium carbonate and nitrates of potassium and sodium can be obtained and added to the dried cake. The fertilizer thus produced will contain nitrates but in other respects will be the same as if sulfuric acid alone were used.

By still another modified process the potassium hydrate may be converted into potassium nitrate and then utilized to prepare a nitrate fertilizer. The solution of potassium carbonate obtained when the product from the digester as a whole, or the filtrate from the insoluble matter, is treated with $CO_2$ is concentrated to a dense solution, cooled, and then saturated with $CO_2$. The potassium carbonate thus becomes converted to potassium bicarbonate. A strong, preferably saturated, solution of potassium bicarbonate is mixed with a strong, preferably saturated, solution of sodium nitrate, the two salts being used in molecular proportion. By double decomposition, sodium bicarbonate and potassium nitrate are formed. The sodium bicarbonate, being sparingly soluble, separates and is filtered out, while the potassium nitrate is recovered from the filtrate by concentration, cooling and crystallization. It is evident that the strong solution of potassium carbonate may be first mixed with the strong solution of sodium nitrate and the mixture then saturated with $CO_2$ and then the same products will be formed as described above. This potassium nitrate may of course be used as an adjuvant to any of the fertilizers described.

To facilitate the practice of my improved process, the following specific information may be given with respect to the exact procedure in practising modification (8):

Feldspar, finely powdered, 100 parts, and lime, 125 parts, are mixed thoroughly with water, 800 parts. The mixture is digested for eight hours at 215 pounds pressure. The result is that about 92 per cent. of the feldspar is decomposed.

The insoluble matter is washed free from alkali metal hydrate. The alkaline liquor and washings are concentrated and neutralized with carbon dioxid or sulfuric acid (any other acid can be used in commercial practice) and evaporated to dryness. About 23 parts of dried product are obtained. The cake is suspended in water and treated with a fifty per cent. solution of 543 parts of niter cake. This is filtered and the residue washed slightly. The solution and washings are concentrated and allowed to crystallize. About 545 parts of Glauber salt are separated. The cake is again suspended in water, a fifty per cent. solution of 150 parts of niter cake is added, filtered, and the residue is thoroughly washed—finally with a little lime water to remove all acidity. The liquor and washings are concentrated, 22 parts of ammonium sulfate are added and the liquor is allowed to crystallize. About 78.5 parts of ammonium alum are obtained from the crystallization. The residue dried weighs about 400 parts, which, with the 23 parts of alkali metal salt, brings the amount of fertilizer to about 423 parts.

The liquors from the crystallization of the alum and the crystallization of the sodium sulfate are joined and from the mixture is obtained about 300 parts of crystals containing about 70 parts of alum and 230 parts of sodium sulfate.

While I have mentioned, and prefer ordinarily to use, calcium hydrate as the alkaline reagent, I mean to include, as equivalents thereof, hydrates of other alkaline earth metals or hydrates of alkali metals, as, for example, barium or strontium, or mixtures of the same.

I do not herein claim the product of the process herein set forth, as the same forms the subject matter of a separate application filed March 17th, 1917, Serial No. 155,388.

Having now fully described my invention, what I claim and desire to protect by Letters Patent is:—

1. The process of producing a fertilizer or fertilizer base which comprises subjecting naturally occurring silicates to treatment with an alkaline hydrate and water under conditions of heat and pressure sufficient to decompose the silicate, and then subjecting the product of digestion to an acid treatment to the extent required to at least convert all the hydrates present into salts.

2. The process of producing a fertilizer or fertilizer base which comprises treating silicates containing alkali metal with calcium hydrate and water and subjecting the mixture to heat and pressure sufficient to decompose the silicate, and then eliminating the resulting alkali hydrate and calcium hydrate and producing an alkali salt and a calcium salt by subjecting the product of digestion to an acid treatment.

3. The process of producing a fertilizer or fertilizer base which comprises treating silicates containing alkali metals with calcium hydrate and water and subjecting the mixture to heat and pressure; separating the aqueous solution from the insoluble and sparingly soluble constituents and treating the solution with an acid thereby forming the alkali metal salts and drying; subjecting the said constituents to treatment with an acid in quantity at least sufficient to convert all the calcium hydrate into a calcium salt and separating the liquor; and mixing the cake with the alkali metal salts to form the fertilizer.

4. The process of producing a fertilizer or fertilizer base which comprises treating silicates containing alkali metals with calcium hydrate and water and subjecting the mixture to heat and pressure; separating the acqueous solution from the insoluble and sparingly soluble constituents and treating the solution with an acid thereby forming alkali metal salts and drying; subjecting the said constituents to treatment with an acid in quantity at least sufficient to convert all the calcium present into a calcium salt and separating the liquor; and mixing the cake with the alkali metal salts to form the fertilizer.

5. The process of producing a fertilizer or fertilizer base which comprises treating silicates containing alkali metals and aluminum with calcium hydrate and water and subjecting the mixture to heat and pressure; separating the aqueous solution from the insoluble and sparingly soluble constituents and treating the solution with an acid thereby forming alkali metal salts and drying; subjecting the said constituents to treatment with an acid in quantity at least sufficient to convert all the calcium present into a calcium salt and set free the aluminum as a hydrate, and separating the liquor; again treating the cake with an acid in quantity sufficient to dissolve the aluminum hydrate and separating the liquor; and mixing the cake with the alkali metal salts to form the fertilizer.

6. The process of producing a fertilizer or fertilizer base which comprises treating silicates containing alkali metals with calcium hydrate and water and subjecting the mixture to heat and pressure; separating the aqueous solution from the insoluble and sparingly soluble constituents and treating the solution with an acid thereby forming alkali metal salts and drying; treating the said constituents with niter cake in quantity at least sufficient to convert all the calcium hydrate into calcium sulfate and the niter cake used into sodium sulfate, separating the solution, and mixing the cake with the alkali metal salts to form the fertilizer.

7. The process of producing a fertilizer or fertilizer base which comprises treating silicates containing alkali metals with calcium hydrate and water and subjecting the mixture to heat and pressure; separating the aqueous solution from the insoluble and sparingly soluble constituents and treating the solution with an acid thereby forming alkali metal salts and drying; treating the said constituents with niter cake in quantity at least sufficient to convert all the calcium into calcium sulfate and the niter cake used into sodium sulfate, separating the solution, and mixing the cake with the alkali metal salts to form the fertilizer.

8. The process of producing a fertilizer or fertilizer base which comprises treating silicates containing alkali metals and aluminum with calcium hydrate and water and subjecting the mixture to heat and pressure; separating the aqueous solution from the insoluble and sparingly soluble constituents and treating the solution with an acid thereby forming alkali metal salts and drying; treating the said constituents with niter cake in quantity sufficient to convert the calcium present into calcium sulfate and the niter cake into sodium sulfate and set free the aluminum as a hydrate, filtering the mass; treating the cake with niter cake in quantity sufficient to dissolve the aluminum hydrate and again filtering the mass and washing and drying; and mixing the cake with the alkali metal salts.

In testimony of which invention, I have hereunto set my hand, at N. Y. city, N. Y., on this 10th day of June, 1916.

LOUIS L. JACKSON.